(No Model.) 2 Sheets—Sheet 1.
J. H. LOUDER.
TEMPORARY BINDER.
No. 395,158. Patented Dec. 25, 1888.
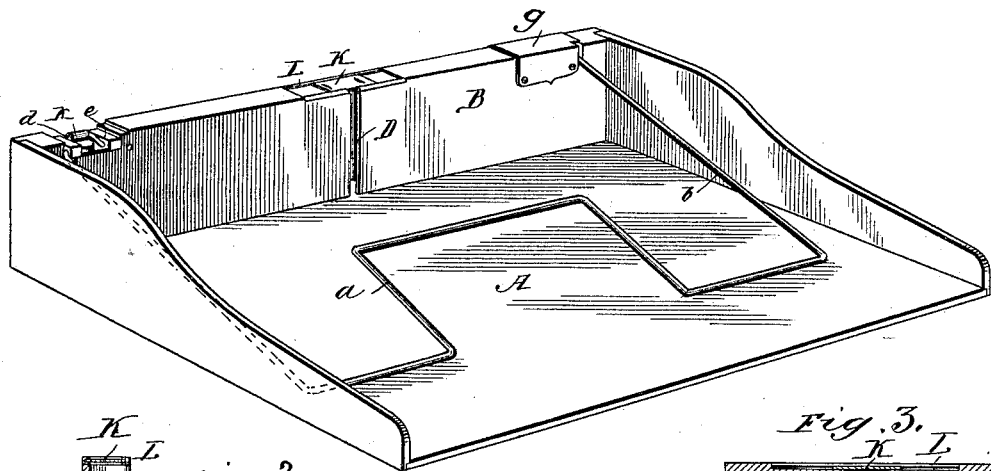
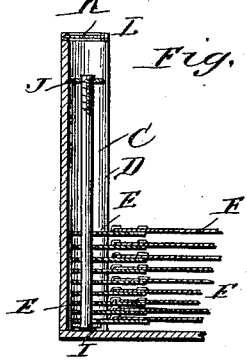
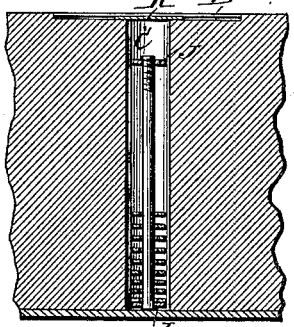
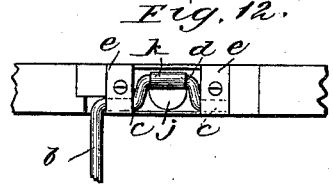
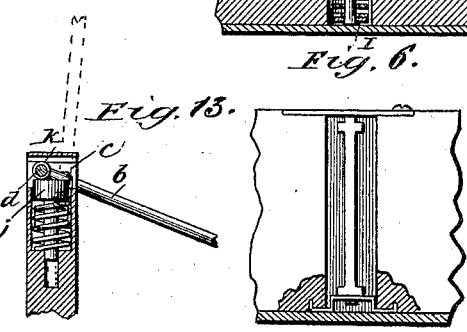
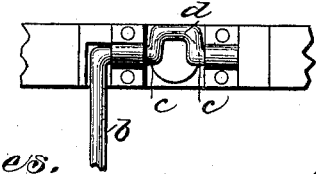
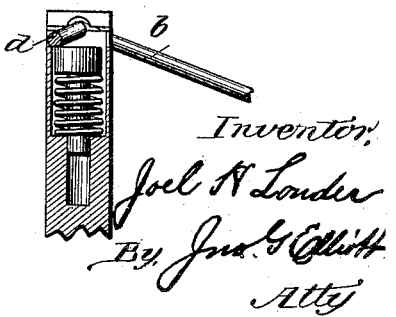
Witnesses.
W. Rossiter
Will R. Onehundred
Inventor:
Joel H. Louder
By Jno. G. Elliott
Atty (No Model.) 2 Sheets—Sheet 2.
J. H. LOUDER.
TEMPORARY BINDER.
No. 395,158. Patented Dec. 25, 1888.
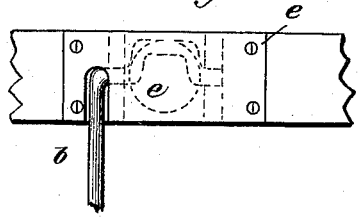
Fig. 16.
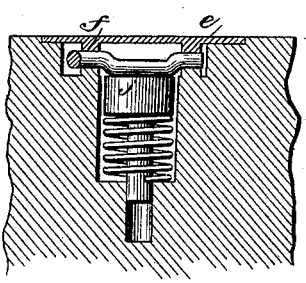
Fig. 17.
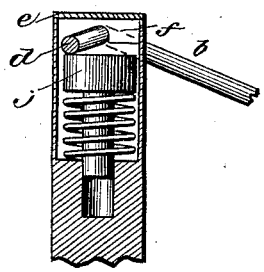
Fig. 18.
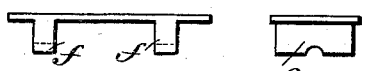
Fig. 19.
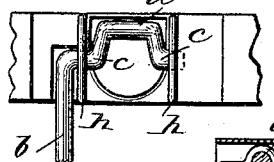
Fig. 20.
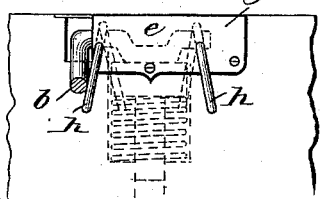
Fig. 21.
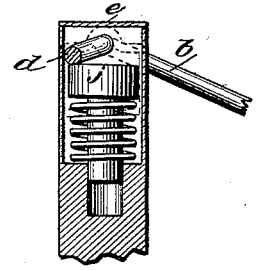
Fig. 22.
Fig. 23.
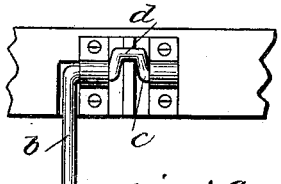
Fig. 24.
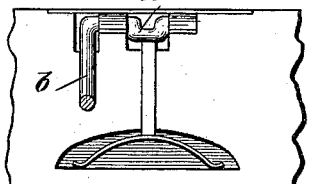
Fig. 25.
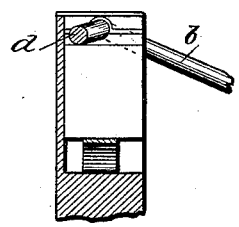
Fig. 26.
Fig. 7a.
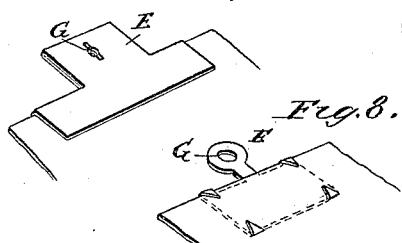
Fig. 8.
Fig. 27.
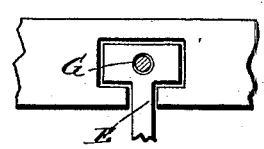
Fig. 11.
Witnesses,
W. Rossiter
Will R. Onehundred
Fig. 9.
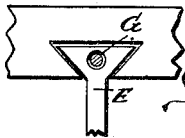
Fig. 10.
Inventor,
Joel N Louder
By, Jno. G. Elliott
Atty.

UNITED STATES PATENT OFFICE.

JOEL H. LOUDER, OF CHICAGO, ILLINOIS.

TEMPORARY BINDER.

SPECIFICATION forming part of Letters Patent No. 395,158, dated December 25, 1888.

Application filed February 23, 1887. Serial No. 228,477. (No model.)

*To all whom it may concern:*

Be it known that I, JOEL H. LOUDER, a citizen of the United States, residing in Chicago, county of Cook, and State of Illinois, have invented certain new and useful Improvements in Temporary Binders, of which the following is a specification.

This invention relates to improvements in temporary binders for holding letter-file indices during their continual use, prior to their removal and storing away into permanent files or cases when the index is filled with file-matter, and has particular reference to that class of binders in which a yielding holder is employed for keeping the index in a compact body, instead of a covering or drop-front for the file.

One of the objects of this invention is to have such a holder consisting of a veil of strong wire yieldingly supported by devices entirely concealed within the back of the binder, whereby a more finished appearance may be given to the binder as a whole, and projecting yielding supports for said holder be dispensed with, thereby permitting the more ready removal and substitution of the indices, and without the necessity of disturbing or removing any part of said support.

Another object is to have such holder secured at its ends directly to the back by a stationary pin adapted to be concealed within the back, and to have a crank or offset formed in said holder next the hinge for engaging and depressing the yielding support thereof, also concealed within the casing, and which yieldingly locks or maintains the holder at either of its adjusted positions.

A further object is to render the removal and substitution of indices more easy and practicable by uniting the various index-sheets with a centering-pin, which not only binds all of the index-sheets together, but enables the insertion of the tags through which the pin passes into a slotted opening in the binder-back as easy of accomplishment as if the tags were united in a single body by preventing a binding of the edges of the tags against the walls of the slot.

Other objects are to provide means for detachably connecting the index-sheets with the centering-pin in such manner that one or more sheets may be removed without disturbing the remaining sheets, and to provide a detachable connection between said pin and the head thereof, whereby tags may be employed having perforations therein of substantially the same diameter as said pin, and be readily removable from such pin, and to provide certain details of construction in the carrying out of my invention, all as illustrated in the accompanying drawings, in which—

Figure 1 represents a perspective view of a binder embodying my invention; Fig. 2, a transverse central section thereof cut through the slot in which works the tags and centering-pin of the index-sheets; Fig. 3, a detail longitudinal section through the same parts and a portion of the back; Fig. 4, a plan view thereof; Fig. 5, a detail perspective view of the centering-pin; Fig. 6, a detail face view of a modified form of the centering-pin and means for holding the index within the casing; Fig. 7, a plan view thereof; Fig. 7$^a$, a detail perspective view of the tag to be used in connection with such a centering-pin; Fig. 8, a similar view of the tag used in connection with the preferred construction; Figs. 9, 10, and 11, detail plan views of several forms of slots and tags corresponding therewith for holding the index in the binder; Figs. 12 and 13, detail plan and transverse sectional views, respectively, of the preferred form of hinge-connection between the index-holder and back, together with the yielding lock therefor; Figs. 14 and 15, similar views of a modified construction; Figs. 16, 17, 18, and 19, plan, longitudinal, and transverse sections and detail views of another modification of a hinge-connection between the holder and back, by which a covering-plate is dispensed with; Figs. 20, 21, 22, and 23, a still further modification of the hinging device, showing a cheaper construction; Figs. 24, 25, 26, and 27, detail views showing modified forms of the yielding support or locking device for the index-holder.

Similar letters of reference indicate the same parts in the several figures of the drawings.

Referring by letter to the accompanying drawings, A indicates the usual frame of a temporary binder of the class to which my invention relates, the back B of which has formed therein about the center of length a vertical slot, C, having preferably the form of a circle, the periphery of which extends beyond the inner face of the back, so as to leave a vertical opening, D, in said face extending from the base to the top of the back leading into said vertical slot, which, for cheapness and utility, I prefer to have a circular outline; but, as shown in Figs. 10 and 11, my invention is not limited to any particular form of slot, but may be square, triangular, oblong, or any other shape that will permit of an opening being formed in the inner face of the back and connected with the slot intermediate the ends thereof, in order that a portion of the back on each side of such opening may be interposed, so as to prevent the removal of the tags on the indices through said opening.

These tags E are preferably stamped out of sheet metal and secured to the index-sheets F in any well-known and convenient manner, the heads of which tags have the same outline, but of slightly less dimensions than the slots C, into which they are to be inserted when the index is placed in position in the binder, and all the tags of an index are provided with central perforations, G, registering with each other, which fit over, so that the tags may slide upon, a vertical centering-pin, H, provided with a fixed head, I, at the lower end thereof and a removable head, J, at the upper end thereof, which in this instance I have shown as screwed upon the pin, so that it may be removed and one or more of the index-sheets be removed or new ones added, but which when in position renders the removal of any one impossible, so that the index-sheets are as securely united as if having a fixed and permanent connection with said pin. The main advantage of employing such a pin in connection with the tags is to facilitate the introduction into and removal from the guide-slot C of the said tags, for, regardless of the shape of such slot, the pin will have the effect of so centering the tags that their edges cannot bind upon the walls of the guide-slot, and they will slide into position in substantially the same manner as would a solid body of the same outline.

It will of course be understood that the necks of the tags connecting their heads with the index-sheets work freely in the vertical opening D, leading to the guide-slot.

Another advantage of having the head of the centering-pin removable is that any one of the index-sheets may be removed at any time, no matter how full the file, and without the necessity of removing any of the matter previously filed.

When the index is placed in position in the binder, in order to prevent its accidental displacement I provide a cap or covering for the upper end of the guide-slot C, the bottom end being closed by the base-board of the binder-frame, which covering may consist of any form of readily-removable device, but, preferably, such a one as is illustrated in the drawings, consisting of a sliding plate, K, working in a suitably-grooved guideway, L, so that it may be quickly slid along to cover up the end of the guide-slot, or else to one side, so as to permit the removal of the centering-pin and tag, this plate being designed to work sufficiently snug in the guideway to be held thereby at any point of its adjustment.

Such a device has the further advantage of being non-separable from the binder, and thereby avoids the ordinary danger of accidental loss or breakage, and also the nuisance of continual removal and replacement.

Figs. 6 and 7 show a modified construction of the centering-pin, in which the pin is struck out of sheet metal, with lateral projections at the top and bottom thereof, constituting fixed heads therefor, and longitudinal end projections engaging a perforation in a metallic step at the bottom, and a horizontally-pivoted spring-cap at the top of the guide-slot, which in this case is rectangular in outline and has the wall on the inner face of the back cut away the entire length of the slot, so that the tags do not serve to hold the index in position in the binder.

Fig. 7ª shows the form of tag preferably used in connection with such a centering-pin, having an oblong slot therein cut at right angles to projections on said pin, so that the tags after being slipped upon the pin at right angles to their normal position will be prevented from accidental displacement by said projections. Both this form and the preferred construction of centering-pin serve to unite the leaves of the index for the purpose of transferring the index and its file contents from the temporary to a permanent binder or case.

It is customary in binders of this character to have the index held flat in the case, so as to prevent the accidental loss of papers filed therein, by a spring-holder, and to this end I have provided the usual holder consisting of a bail, a, of stout wire bent into any suitable form and having its ends secured, respectively, to either end of the back at the top edge thereof, with the bent portion inclining downwardly, so as to bear upon the index. The ends of this bail are both formed and supported in identically the same manner, and in my further description I will therefore refer to one end only for brevity and clearness of description. The end of the bail is bent at right angles to the side arms, b, thereof, so as to form two straight portions, c, and an offset or cranked portion, d, intermediate said straight portion, the latter of which constitutes pivot-bearings, about which the crank portion swings whenever the arm b is raised or lowered, being held rigidly in position by bearing boxes or plates e, which are secured by screws or otherwise to and countersunk in the upper edge of the back. The manner of forming this hinge or pivot connection with the back may vary according to the taste of the user or the thickness of the back of the binder, the construction shown in Figs. 12 and 13 being preferred, because of its adaptability for use and perfect operativeness in the narrowest possible limits, the bearing-surface of the plates being thrown to the innermost edge thereof, thus giving the crank full play to the rear the length of said plates, and consequently the thickness of the back, which in practice is never less than a half-inch. When, however, the back is materially thicker, the bearing-surface of the plates may be located in the center, as shown in Figs. 14 and 15.

Figs. 16, 17, 18, and 19 show another construction of the capping-plate e, in which both plates are cast in one, with the bearing portions f projecting downwardly therefrom and the entire bearing countersunk within the back, so as to give a smooth finish thereto and at the same time conceal the hinging device and the yielding support, hereinafter to be described; and this form of capping-plate also dispenses with the necessity of a covering-plate, g, such as is necessary in all of the other constructions.

In Figs. 20, 21, 22, and 23 is shown still another form of hinging or pivoting device, consisting of bent wires h, taking the places of the plates e, and having their depending ends bent downwardly over the edges of the back at oblique angles to each other, with the pointed ends i thereof again bent at right angles and driven or clinched into the back. Immediately underlying the crank portion of the bail, and working in a vertical recess formed in the back between the bearing-plates, is a spring-seated pin, j, constituting a support for, and therefore having a spring tension against, the crank portion of the bail, the said support having an enlarged head, so as to form a sufficiently broad surface, upon which the crank portion bears, and at the same time form a shoulder by the under side thereof, between which and the bottom of the recess, and surrounding the smaller portion of said pin-support, is a spiral spring exerting an upward or outward tension.

The operation of this portion of the device will be clearly understood from an inspection of Fig. 13, in which the first position of the bail and the crank portion thereof relative to its hinged connection and yielding support is shown in full lines, with the bail in its normal and therefore depressed position, bearing upon the index. When, however, the bail is elevated to the position shown by the dotted lines in the same figure, the spring-seated or yielding support will be correspondingly depressed, the tension thereof being utilized when in this position to maintain the bail in its elevated position by reason of the same having passed beyond the dead-center. When, however, the bail is again depressed, the yielding support resumes its normal position and exerts a spring tension upon the bail, so as to hold the index flat and prevent the contents thereof from accidental dislodgment.

Figs. 24, 25, 26, and 27 illustrate modified forms of the yielding locking device, which are obviously within the scope of this invention.

By preference, an anti-friction roller, k, such as shown in Figs. 12 and 13, will be mounted upon the crank portions of the bail, so as to reduce the wear between them and their supporting devices.

Before my invention a temporary binder has been provided with a guide-rod located in a recess in the wall of the case, the index-sheets of said binder being provided with tags, through eyes in which the guide-rod projects; but in such prior construction the guide-rod is fixed in and not detachable from the case, and therefore cannot be utilized to bind the index-sheets after removal from the case, and the recess, being substantially square in cross-section, is not adapted to support or retain the tags of the index-sheets independently of the guide-rod, as is a circular recess, and besides such a form of recess must be mortised out, and therefore requires more time and labor in its formation than does a circular recess, which may be bored out.

In another prior construction a clamping-bail for the index-sheets has been provided with a cranked portion actuated by a straight flat spring normally standing perpendicular to the plane of the index-sheets and projecting above the crank-arm; but in such construction the spring exerts an indirect force upon the bail, which force at best is necessarily weak, and is weaker when the bail is depressed upon the index-sheets than at any other time, because of such indirectness of such force and the further fact that the spring has little or no tension at such time.

Having described my invention, what I claim, and desire to secure by Letters Patent, is—

1. In a temporary binder, the combination of a back provided with a slot opening upon its upper and inner edges, a removable centering-pin in said slot, a removable head or nut on said pin fitting the walls of said slot, a centering-pin in said slot, and a series of sheets provided with tags perforated to receive the centering-pin, whereby the sheets are removable from the binder without detachment from each other, substantially as described.

2. In a temporary binder, the combination of the back, the index-holder, and a hinge or pivot connection, said back being recessed as shown, and a spring-seated pin working in said recess, said index-holder being provided with a crank portion or projection engaging and depressing said pin, substantially as described.

JOEL H. LOUDER.

Witnesses:
W. W. ELLIOTT,
WILL R. OMOHUNDRO.